G. W. FAGAN.
REPAIRING STAND.
APPLICATION FILED APR. 13, 1920.
1,379,907.
Patented May 31, 1921.
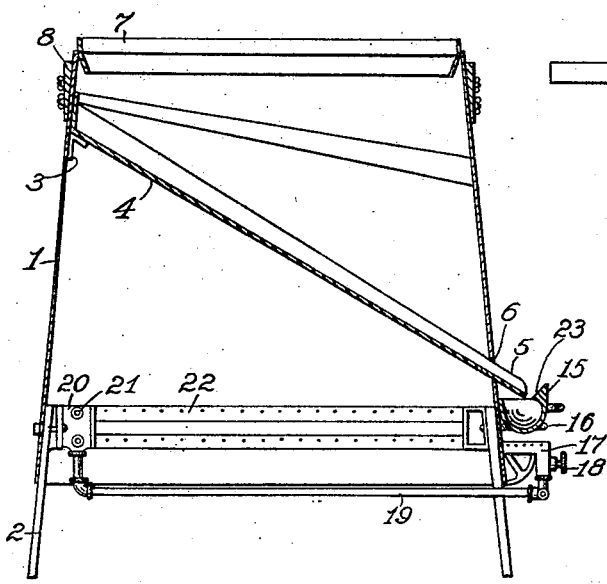
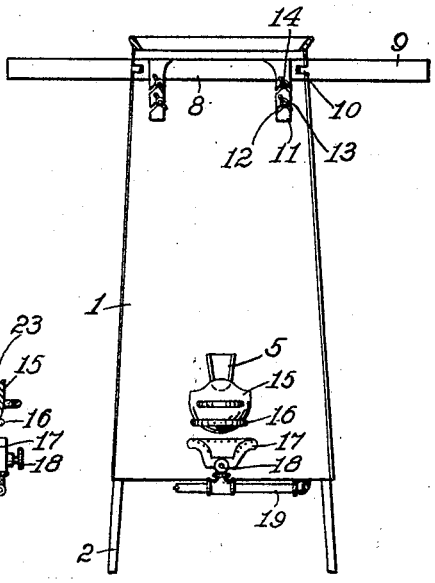
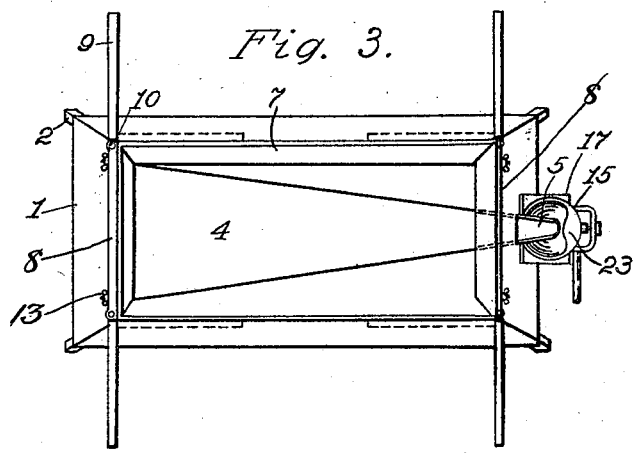
Inventor,
G. W. Fagan, by
G. C. Kennedy,
Attorney.

UNITED STATES PATENT OFFICE.

GEORGE W. FAGAN, OF CEDAR FALLS, IOWA.

REPAIRING-STAND.

1,379,907. Specification of Letters Patent. Patented May 31, 1921.

Application filed April 13, 1920. Serial No. 373,615.

*To all whom it may concern:*

Be it known that I, GEORGE W. FAGAN, a citizen of the United States of America, and a resident of Cedar Falls, Blackhawk county, Iowa, have invented certain new and useful Improvements in Repairing-Stands, of which the following is a specification.

My invention relates to improvements in repairing stands, and the object of my improvement is to supply for the use of mechanics a device of this class which is devoted particularly to repairs of the radiators of motor-vehicles, especially in soldering operations thereon, or in the repair or renewal of other devices or articles.

This object I have accomplished by the means which are hereinafter described and claimed, and which are illustrated in the accompanying drawings, in which Figure 1 is a vertical medial longitudinal section of my improved repairing stand; Fig. 2 is an end elevation thereof, and Fig. 3 is a top plan view thereof.

In said figures, similar numerals of reference denote similar parts throughout the several views.

The numeral 1 denotes a hollow frame or casing of truncated pyramidal form, open at top and bottom, and preferably supported on legs 2 fixed thereon. Solid bars 8, are secured upon the outer upper wall of said casing 1, and horizontally-swinging arms 9 are mounted thereon by means of hinges 10. These arms serve as means for holding the work, and may be swung horizontally for desired positions of adjustment thereunder.

The bars 8 are secured to the casing 1 for vertical adjustment as follows. The bars on the ends of the device, have depending parts 11, each of which has oblique edge slots 12 to adjustably receive threaded pins 14 projected outwardly from said casing, and secured by wing-nuts 13.

The numeral 7 denotes a hopper-shaped body which may be mounted removably in the open top of said casing.

Within the upper part of the hollow casing 1 is removably supported on a bracket 3, and in an end-wall opening 6 opposite, an inclined trough 4, whose side portions meet the adjacent inner side-walls of the casing, sloping thence inwardly to provide the trough which terminates at its lower end in a diminished open spout 5 which protrudes outwardly through said opening 6. Underneath said spout 5 an annular bracket 16 is fixed on said casing, and is adapted to seat a removable open-top vessel 15, the latter having a looped handle, and also having its outer upper edge farthest from the spout shaped as an upwardly-directed lip 23 whose inner face is inclined inwardly, to receive molten liquid solder from said spout and conduct it into the vessel without splashing or escape therefrom.

Any desired heating-means may be employed, whether mounted on said device, or separate therefrom, to heat the inclined trough 4 and the vessel 15. For convenience, I have provided heating-means mounted on the casing. The numeral 22 denotes parallel horizontal burner-tubes, each having numerous small orifices alined thereon longitudinally for gas-vents, and these tubes are supported longitudinally beneath the inclined trough 4 by bolts traversing end-castings on the tubes, of which one casting 20 is a hollow distributing-chamber in communication with said tubes by means of manually-controlled valves having outer rock-disks 21, and with a gas-pipe 19 for supplying gas. The latter pipe is also in communication with an orificed hollow burner 17 positioned under said vessel 15, controlled by a valve operated by a rock-disk 18.

A radiator may be placed upon the top parts of said device, and molten solder poured through the interstices thereof to fill in cracks or repair defective places, and the waste or drippings of the solder is received within the upper hopper 7, directed thence toward the middle of the trough 4 underneath, and, being kept hot and fluid by the said heating-means, flows down the trough, to be delivered thence through the spout 5 into the heated vessel 15 where it is received and may be again used without loss.

This device is especially useful in garages, repair-shops, or tin-shops for general use. Variations of this device come within the scope of the principles of the invention.

Having described my invention, what I claim as new and desire to secure by Letters Patent, is:

1. In a device of the character described, a hollow casing open at top and bottom, an inclined trough removably mounted across the interior of said casing, said casing having a port through which said trough delivers its contents, an open receptacle removably supported on said casing to receive from said trough, a hopper removably supported in the open top of said casing to deliver into said trough, elongated heating means supported within the lower part of said casing under said trough, and other heating-means supported without said casing under said open receptacle.

2. In a device of the character described, a hollow open-ended casing, an open hopper-body fitted removably in the upper open end thereof, rack-arms mounted to swing on the upper end of said casing to and from its outer surface and vertically adjustable thereon, an inclined trough mounted removably in said casing, an open-top vessel mounted removably on said casing to receive from the delivery-end of said trough, heating-means mounted within said casing under said trough, and other heating means mounted on said casing under said vessel.

Signed at Waterloo, Iowa, this 27th day of March, 1920.

GEORGE W. FAGAN.